(12) United States Patent
Koteich et al.

(10) Patent No.: US 12,504,015 B2
(45) Date of Patent: Dec. 23, 2025

(54) METHOD OF SETTING UP AN ELECTRICAL MOTOR SPEED CONTROL IN A FLUIDIC SYSTEM

(71) Applicant: Schneider Toshiba Inverter Europe SAS, Pacy sur Eure (FR)

(72) Inventors: Mohamad Koteich, Vernon (FR); Kamal Ejjabraoui, Gravigny (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 229 days.

(21) Appl. No.: 17/994,479

(22) Filed: Nov. 28, 2022

(65) Prior Publication Data

US 2023/0175515 A1    Jun. 8, 2023

(30) Foreign Application Priority Data

Dec. 3, 2021   (EP) ..................................... 21306703

(51) Int. Cl.
*F04D 25/06* (2006.01)
*F04B 37/08* (2006.01)
(Continued)

(52) U.S. Cl.
CPC .............. *F04D 25/06* (2013.01); *F04B 37/08* (2013.01); *F04B 49/065* (2013.01); *F04D 19/04* (2013.01);
(Continued)

(58) Field of Classification Search
CPC ...... F04D 19/04; F04D 19/042; F04D 27/001; F04D 27/00; F04D 19/048; F04D 27/0261; F16C 2360/45; F04B 37/08; F04B 49/065
See application file for complete search history.

(56) References Cited

U.S. PATENT DOCUMENTS 5,443,368 A * 8/1995 Weeks .................... F04D 27/00
417/42
5,652,473 A * 7/1997 Delamare ........... F16C 32/0465
310/90

(Continued)

OTHER PUBLICATIONS

European Search Report and Search Opinion dated May 30, 2022 for corresponding European Patent Application No. EP21306703.6, 10 pages.

*Primary Examiner* — Peter J Bertheaud
(74) *Attorney, Agent, or Firm* — Wolf, Greenfield & Sacks, P.C.

(57) ABSTRACT

A method of setting up an electrical motor speed control in a fluidic system including a turbomachine, an electric motor having a number p of pole pairs rotating the turbomachine, a variable speed drive controlling the speed of the electric motor, a sensor measuring a parameter H, Q of the turbomachine, and a system controller receiving the sensor's measurements and controlling the operation of the fluidic system. The method includes driving the electric motor at a predetermined electrical frequency, Fe, such that the turbomachine rotates with a controlled rotational speed N, determining the point of intersection of the system curve of the fluidic system and of the performance curve of the turbomachine to obtain the turbomachine's nominal operating point, and thus the nominal value, Hn, Qn, of the turbomachine parameter, measuring, with the sensor, the current value, H, Q of the turbomachine parameter, calculating the controlled rotational speed N by inputting, into the Affinity Laws, the determined nominal value, Hn, Qn, the measured current value, H, Q, and the known nominal rotational speed, Nn, of the turbomachine, determining the number p of pole pairs of the electric motor based on the ratio of the electrical frequency Fe and the calculated controlled rotational speed N, and adapting the setup of the (Continued)

variable speed drive to match the determined number p of pole pairs.

14 Claims, 4 Drawing Sheets

(51) Int. Cl.
*F04B 49/06* (2006.01)
*F04D 19/04* (2006.01)
*F04D 27/00* (2006.01)
*F04D 27/02* (2006.01)

(52) U.S. Cl.
CPC ......... *F04D 19/042* (2013.01); *F04D 19/048* (2013.01); *F04D 27/00* (2013.01); *F04D 27/001* (2013.01); *F04D 27/004* (2013.01); *F04D 27/0261* (2013.01); *F16C 2360/45* (2013.01)

(56) References Cited

U.S. PATENT DOCUMENTS

| | | | |
|---|---|---|---|
| 8,753,095 B2 * | 6/2014 | Bruce | F04D 15/0263 417/423.4 |
| 9,091,259 B2 * | 7/2015 | Tamminen | F04D 15/029 |
| 2008/0067116 A1 | 3/2008 | Anderson et al. | |
| 2020/0025400 A1 | 1/2020 | Nagle, Jr. et al. | |

* cited by examiner

METHOD OF SETTING UP AN ELECTRICAL MOTOR SPEED CONTROL IN A FLUIDIC SYSTEM

CROSS-REFERENCE TO RELATED APPLICATIONS

This patent claims priority under 35 U.S.C. § 119 to European Patent Application No. 21306703.6, filed on Dec. 3, 2021, and titled "METHOD OF SETTING UP AN ELECTRICAL MOTOR SPEED CONTROL IN A FLUIDIC SYSTEM."

TECHNICAL FIELD & BACKGROUND ART

The present disclosure relates to the control of fluid transporting turbomachines, which are installed in fluidic systems, such as pumping systems or HVAC systems.

In most fluidic systems, fluid transporting turbomachines, such as pumps, compressors, or fans, are driven by electric motors. Typically, an electric motor driving such a turbomachine is controlled using a variable speed drive. When the turbomachine and its corresponding electric motor and variable speed drive are installed in the fluidic system, the variable speed drive needs to be properly set up so that it can accurately control the speed of the electric motor during operation. One of the parameters needed to configure the variable speed drive during setup is the number of pole pairs of the electric motor.

Yet, it turns out that, in many industrial settings, the number of pole pairs of a given electric motor is not readily available.

If the electric motor has a shaft sensor, its rotational speed can be measured, and its number of pole pairs deduced therefrom. However, in many situations, electric motors are not fitted with a shaft sensor, and the rotational speed of the electric motor cannot be directly measured.

It may also be possible to determine the number of pole pairs by dismounting the electric motor from the fluidic system and subjecting it to different tests. However, this is often cumbersome and time-consuming.

SUMMARY

In view of the above, it is an object of the present disclosure to provide a simple, quick and efficient method of identifying the number of pole pairs of an electric motor driving a turbomachine in a fluidic system, so that a variable speed drive controlling the electric motor can be properly set up.

According to the present disclosure, this object is achieved by a method of setting up an electrical motor speed control in a fluidic system, the fluidic system being characterised by a given system curve, the fluidic system comprising a turbomachine for transporting fluid through the fluidic system, the turbomachine being characterised by a given performance curve for a known nominal rotational speed, Nn, of the turbomachine's rotor, an electric motor for rotating the turbomachine's rotor, the electric motor having a number p of pole pairs, a variable speed drive for controlling the speed of the electric motor, a sensor for measuring a parameter H, Q or P of the turbomachine, characterised by the turbomachine's performance curve, and a system controller for receiving the sensor's measurements and for controlling the operation of the fluidic system, wherein the method includes the following steps: driving the electric motor at a predetermined and constant electrical frequency, Fe, under the control of the variable speed drive, such that the turbomachine's rotor rotates with a controlled rotational speed N, determining, by the system controller, the point of intersection of the system curve and the performance curve to obtain the nominal operating point of the turbomachine in the fluidic system at the nominal rotational speed Nn, and thus the nominal value, Hn, Qn, Pn, of the turbomachine parameter, measuring, with the sensor, the current value, H, Q or P, of the turbomachine parameter, calculating, by the system controller, the controlled rotational speed N based on the Affinity Laws applicable to turbomachines in combination with the determined nominal value, Hn, Qn or Pn, of the turbomachine parameter, the measured current value, H, Q or P, of the turbomachine parameter and the known nominal rotational speed, Nn, of the turbomachine's rotor, determining, by the system controller, the number p of pole pairs of the electric motor based on the ratio of the electrical frequency Fe and the calculated controlled rotational speed N, and adapting the setup of the variable speed drive to match the determined number p of pole pairs.

The proposed method relies on the system curve of the fluidic system and on the performance curve of the turbomachine. Both curves are readily available since they are needed anyway in the design of the fluidic system. The method also gathers data from the already installed standard fluid sensors of the fluidic system. This information, put to use in the well-known Affinity Laws for turbomachines, yields the rotational speed of the electric motor and thus its number of pole pairs. In other words, the present method does not need any additional input besides nominal characteristics and usual measurements, which makes it easy to implement. Indeed, in this way, the electric motor can be characterised in situ with minimal intervention, and without additional equipment.

According to the present disclosure, the above object is also achieved with a variable speed drive for the rotational speed control of an electric motor having a number p of pole pairs and driving a turbomachine installed in a fluidic system, the variable speed drive being configured to drive the electric motor at a predetermined and constant electrical frequency, Fe, such that the turbomachine rotates with a controlled rotational speed N, obtain the system curve of the fluidic system and the turbomachine's performance curve for a known nominal rotational speed, Nn, determine the point of intersection of the obtained system curve and the obtained performance curve to obtain the nominal operating point of the turbomachine in the fluidic system at the nominal rotational speed Nn, and thus the nominal value, Hn, Qn or Pn, of a parameter characterising the turbomachine's operation, obtain a current value, H, Q or P, of the turbomachine parameter while the turbomachine is rotating at the controlled rotational speed N, calculate the controlled rotational speed N based on the Affinity Laws applicable to turbomachines in combination with the determined nominal value, Hn, Qn or Pn, of the turbomachine parameter, the obtained current value, H, Q or P, of the turbomachine parameter and the known nominal rotational speed, Nn, of the turbomachine, determine the number p of pole pairs of the electric motor based on the ratio of the electrical frequency Fe and the calculated controlled rotational speed N, and adapt its setup to match the determined number p of pole pairs.

The following features can be optionally implemented, separately or in combination one with the other:

the turbomachine parameter is the volumetric fluid flow rate Q generated by the turbomachine, or the total dynamic head H across the turbomachine, or the mechanical power P delivered by the turbomachine;

the turbomachine is a pump, a compressor, or a fan, and in particular a centrifugal pump;

the fluidic system is an HVAC system;

the electric motor is a permanent magnet synchronous motor;

the sensor is a pressure sensor, a flow rate sensor, or a power sensor.

BRIEF DESCRIPTION OF THE DRAWINGS

Embodiments of the present disclosure will now be described in detail with reference to the appended drawings, in which.

DESCRIPTION OF EMBODIMENTS

Figure 1:
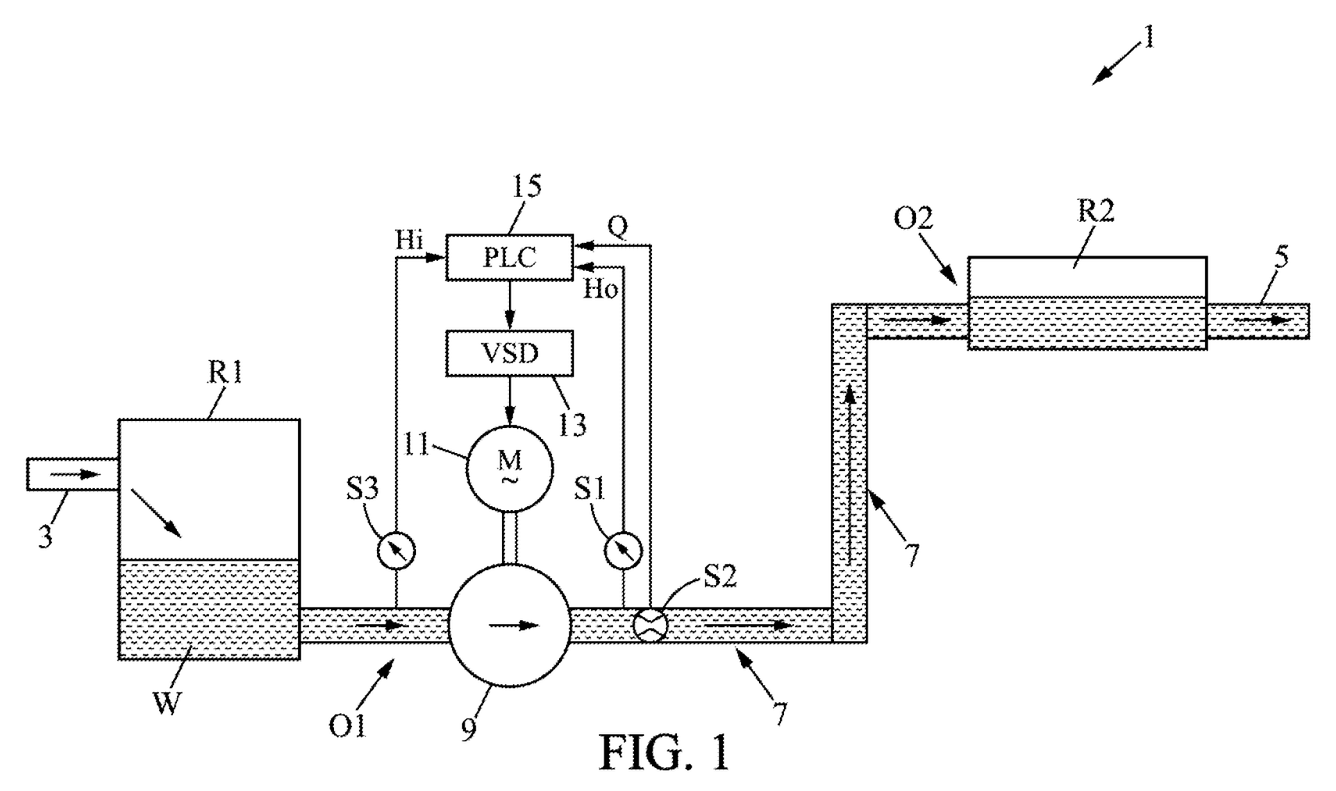
FIG. 1 is a schematic diagram of a first embodiment of a fluidic system according to the present disclosure.

With reference to FIG. 1, there is shown a fluidic system 1 according to the present disclosure.

Specifically, fluidic system 1 is a hydraulic system for storing and conveying a liquid W, such as water. The hydraulic system 1 has an inlet 3 and an outlet 5. During its transit through the hydraulic system 1, water W will cross a first reservoir R1, flow through piping 7, and cross a second reservoir R2. The water W is pumped through the hydraulic system 1 by a centrifugal pump 9.

The centrifugal pump 9 has a rotor (not shown), which can be rotated by an electric motor 11.

The electric motor 11 is characterised by a specific number p of pole pairs. The electric motor 11 can be any type of electric motor, but preferably, is a permanent magnet synchronous motor. The electric motor 11 is controlled by a variable speed drive or VSD 13.

The hydraulic system 1 also has three fluid sensors S1, S2 and S3. The first and third fluid sensors S1 and S3 are pressure sensors and the second fluid sensor S2 is a flow rate sensor.

The operation of the hydraulic system 1 is controlled by a system controller 15, which, in the present example, is a programmable logic controller or PLC. The sensors S1, S2 and S3 provide their measurements Hi, Ho and Q to the system controller 15.

In the present example, pressure sensors S1 and S3 measure the hydraulic pressure Ho at the pump's outlet and the hydraulic pressure Hi at the pump's inlet, respectively. The PLC 15 calculates the total dynamic head H across the centrifugal pump 9 by subtracting the measurement Ho provided by the pressure sensor S1 at the pump's outlet from the measurement Hi provided by the pressure sensor S3 at the pump's inlet. Thus, H=Ho−Hi.

The flow rate sensor S2 measures the volumetric fluid flow rate Q generated by the centrifugal pump 9.

Figure 3:
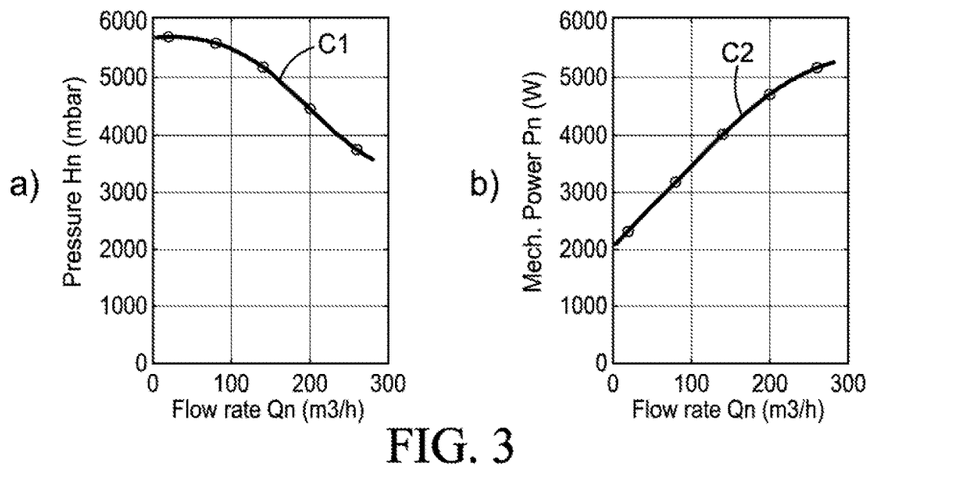
FIG. 3 shows exemplary performance curves of a turbomachine.

The centrifugal pump 9 is characterised by one or more performance curves, two of which are shown in FIG. 3. Such performance curves are provided by the manufacturer of a centrifugal pump. They are a standard part of a centrifugal pump's datasheet. Pump manufacturers generate these performance curves by conducting operational tests with the pump.

The performance curve C1 of FIG. 3a is a plot of the nominal total dynamic head Hn of the centrifugal pump 9 as a function of the nominal volumetric fluid flow rate Qn generated by the centrifugal pump 9. The curve C1 in FIG. 3a shows the relationship between the head and flow rate at a known constant nominal rotational speed Nn of the centrifugal pump 9.

The nominal rotational speed Nn is the constant rotational speed at which the pump manufacturer conducted the operational tests to generate the performance curve C1.

When the centrifugal pump 9 runs at the nominal rotational speed Nn, the head H of the pump 9 and its flow rate Q will be at a nominal value somewhere along the performance curve C1. The pump's exact position on the curve C1 depends on the specifics of the hydraulic system in which the pump 9 is installed.

Typically, the performance curve C1 and the corresponding nominal rotational speed Nn are given in the datasheet of the centrifugal pump 9.

The pump's datasheet may also contain additional performance curves, such as the performance curve C2 shown in FIG. 3b. The performance curve C2 shows the relationship between the pump's mechanical power P and the pump's generated flow rate Q at the nominal rotational speed Nn.

Figure 4:
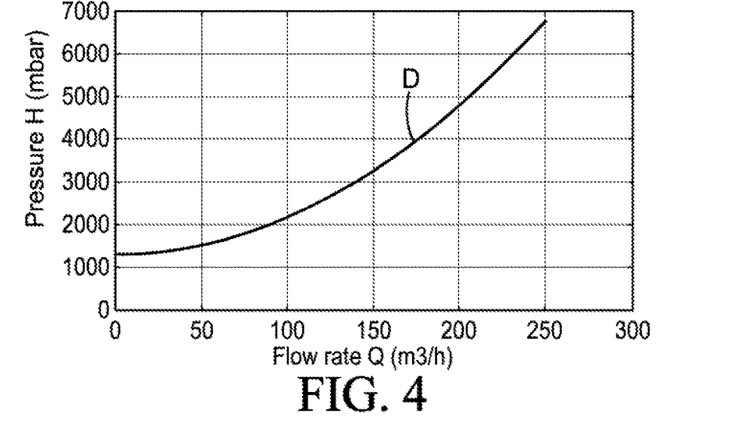
FIG. 4 is an example of a typical system curve of a fluidic system.

FIG. 4 shows a typical system curve D of a fluidic system, namely the system curve of the hydraulic system 1 of FIG. 1. System curve D illustrates the behaviour of the corresponding fluidic system using the two hydraulic variables of head and flow rate. Specifically, system curve D shows the total dynamic head H across the pump 9 as a function of the flow rate Q generated by the pump 9 in the hydraulic system 1.

The shape of the system curve D depends on the exact configuration of the fluidic system. In the exemplary hydraulic system 1 of FIG. 1, the centrifugal pump 9 is used to fill the reservoir R2 with water W. In such a configuration, the total dynamic head H across the pump 9 is a quadratic function of the flow rate Q, with a static component K due to the elevation between the pump's suction point O1 and the discharge point O2, and a dynamic component proportional to the square of the flow rate Q, which is due to the friction losses in the piping 7. The system curve D can thus be expressed by the following equation:

$$H = K + a*Q^2 \tag{1}$$

In other words, in the present example, the system curve D is a parabola.

We will now explain how the method according to the present disclosure of setting up an electrical motor speed control in a fluidic system can be implemented in the hydraulic system 1 of FIG. 1.

Let us suppose that an operator has assembled the hydraulic system 1 of FIG. 1 and now would like to configure the variable speed drive 13 so that it can properly control the rotational speed of the electric motor 11 and thus of the centrifugal pump 9 during operation of the hydraulic system 1.

To properly configure the variable speed drive 13, the number of pole pairs p of the electric motor must be known. Let us assume that, in the present case, this parameter is not readily available to the operator.

To address this problem, according to the present disclosure, the number of pole pairs p is determined automatically by the system controller 15. The automatic routine, which is run by the system controller 15 to determine the number p of pole pairs, includes the following steps:

Firstly, the variable speed drive 13 drives the electric motor 11 at a predetermined and constant electrical frequency Fe, such that the pump's rotor rotates with a controlled and constant rotational speed N.

In a further step, the system controller 15 determines the point of intersection A of the system curve D and the performance curve C1 to obtain the nominal operating point of the centrifugal pump 9 in the hydraulic system 1 at the nominal rotational speed Nn. This is illustrated in FIG. 5.

Indeed, when the centrifugal pump 9 runs at the nominal rotational speed Nn as indicated in its datasheet, it will necessarily operate at the equilibrium corresponding to the point of intersection A since it must conform itself to the boundary conditions set by the hydraulic system 1.

Figure 5:
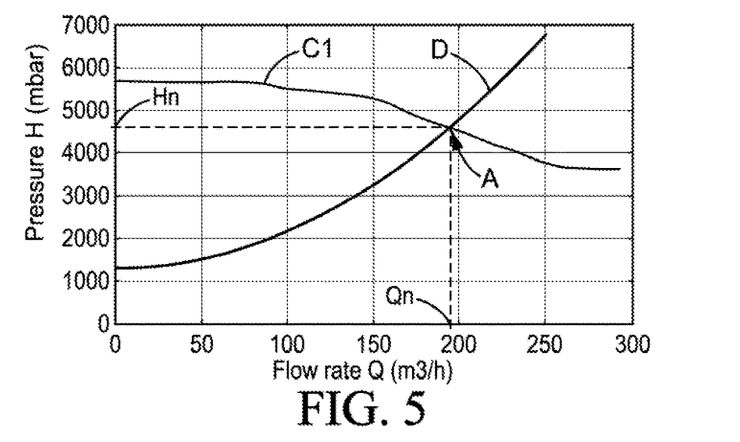
FIG. 5 illustrates the determination of the nominal operating point of a turbomachine using a performance curve and a system curve.

With reference to FIG. 5, the two coordinates of the nominal operating point A correspond to the pump's nominal flow rate Qn and the pump's nominal head Hn in the hydraulic system 1. By determining the point of intersection A of the system curve D and the performance curve C1, the system controller 15 can thus deduce the values of Hn and Qn for the hydraulic system 1.

In a further step, the current value H for the head and/or the current value Q for the fluid flow rate are measured with the fluid sensors S1, S2 and S3. As apparent from FIG. 1, this information is provided to the system controller 15.

In a further step, the system controller 15 calculates the controlled rotational speed N set by the variable speed drive 13 using the so-called Affinity Laws applicable to centrifugal pumps. These well-known laws are mathematical relationships that allow for the estimation of changes in pump performance as a result of a change in one of the basic parameters of the pump.

Conventionally, there is a set of three Affinity Laws, which are expressed as follows:

$$Q1/Q2 = N1/N2 \quad (2)$$

$$H1/H2 = (N1/N2)^2 \quad (3)$$

$$P1/P2 = (N1/N2)^3 \quad (4)$$

In these equations, N1 and N2 are two different rotational speeds of the pump, Q1 and Q2 are the corresponding flow rates, H1 and H2 are the corresponding head, and P1 and P2 are the corresponding mechanical power of the pump.

Applying these laws to the present case, one can derive three different expressions for the controlled rotational speed N:

$$N = Nn \times \left(\frac{Q}{Qn}\right) \quad (5)$$

$$N = Nn \times \sqrt{\left(\frac{H}{Hn}\right)} \quad (6)$$

$$N = Nn \times \sqrt[3]{\left(\frac{P}{Pn}\right)} \quad (7)$$

According to the present disclosure, the system controller 15 relies on equation 5, 6 or 7 to calculate the controlled rotational speed N.

For example, the system controller 15 can use equation 5 and plug into this equation the nominal rotational speed Nn known from the pump's datasheet, the current flow rate Q obtained from the flow rate sensor S2 and the nominal flow rate Qn given by the operating point A (see FIG. 5).

Alternatively, the system controller 15 can rely on equation 6 and, again, plug into this equation the nominal rotational speed Nn, as well as the current head H obtained from the pressure sensors S1, S3 and the nominal head Hn obtained from the operating point A.

The system controller 15 may also use equation 7 to arrive at the controlled rotational speed N. In this case, the system controller 15 could obtain the current mechanical power P of the pump for example from the variable speed drive 13. Indeed, the VSD 13 measures the electrical power at its terminals, which corresponds to the pump's mechanical power P. The system controller 15 could obtain the nominal value Pn of the power in a similar way as the one shown in FIG. 5, i.e., by equating a system curve of the hydraulic system 1, which expresses the power P as a function of flow rate, to the performance curve of FIG. 3b, to thus obtain a corresponding operating point with coordinates (Qn, Pn).

Figure 6:
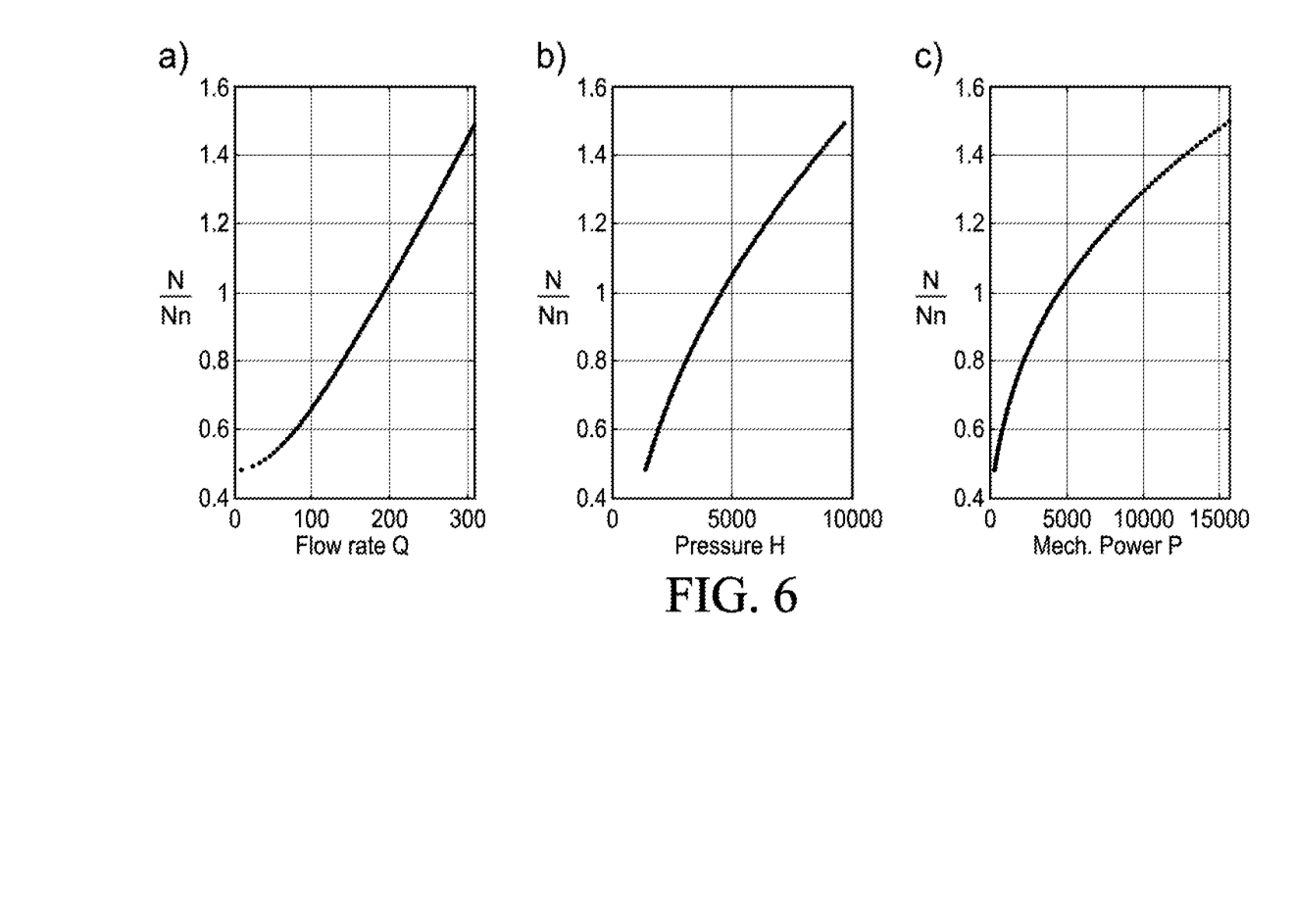
FIG. 6 shows three curves, which represent rotational speed ratio N/Nn as a function of the flow rate Q, the head H, and the mechanical power P, respectively, and which may be obtained by the method of the present disclosure.

Turning now to FIG. 6, the corresponding graphs a, b, and c each show a curve of the ratio of the current speed N to the nominal speed Nn as a function of one parameter of the centrifugal pump 9. Graph a shows the speed ratio N/Nn as a function of the flow rate Q, graph b shows the speed ratio N/Nn as a function of the total dynamic head H, and graph c shows the speed ratio N/Nn as a function of the pump's mechanical power P.

When the static component in the system curve is zero, graph a amounts to a plot of the first Affinity Law, i.e., equation 5, graph b is a plot of the second Affinity Law, i.e., equation 6, and graph c is a plot of the third Affinity Law, i.e., equation 7. In the present example, cf. FIG. 4, the system curve D has a static component (i.e. H>0 at Q=0), and therefore graphs a, b and c of FIG. 6 do not represent the Affinity Laws directly.

Once it has calculated the controlled rotational speed N, in a further step, the system controller 15 can then deduce the number p of pole pairs of electric motor 11 therefrom. Indeed, the number p of pole pairs is equal to the ratio of the electrical frequency Fe and the rotational speed N. If the rotational speed N is expressed in revolutions per minute and the electrical frequency Fe in Hertz, the system controller 15 determines the number p of pole pairs with the following equation:

$$p = 60 * Fe/N \quad (8)$$

The system controller 15 may preferably round the number obtained for p to the nearest integer since, by definition, the number p of pole pairs must be an integer.

The final step of the automatic routine carried out by the system controller 15 consists of adapting the setup of the variable speed drive 13 to match the determined number p of pole pairs.

With the just described method, the system controller 15 can thus automatically adapt the configuration of the variable speed drive 13 to the specific electric motor 11 at hand, with minimal intervention by the operator.

Figure 2:
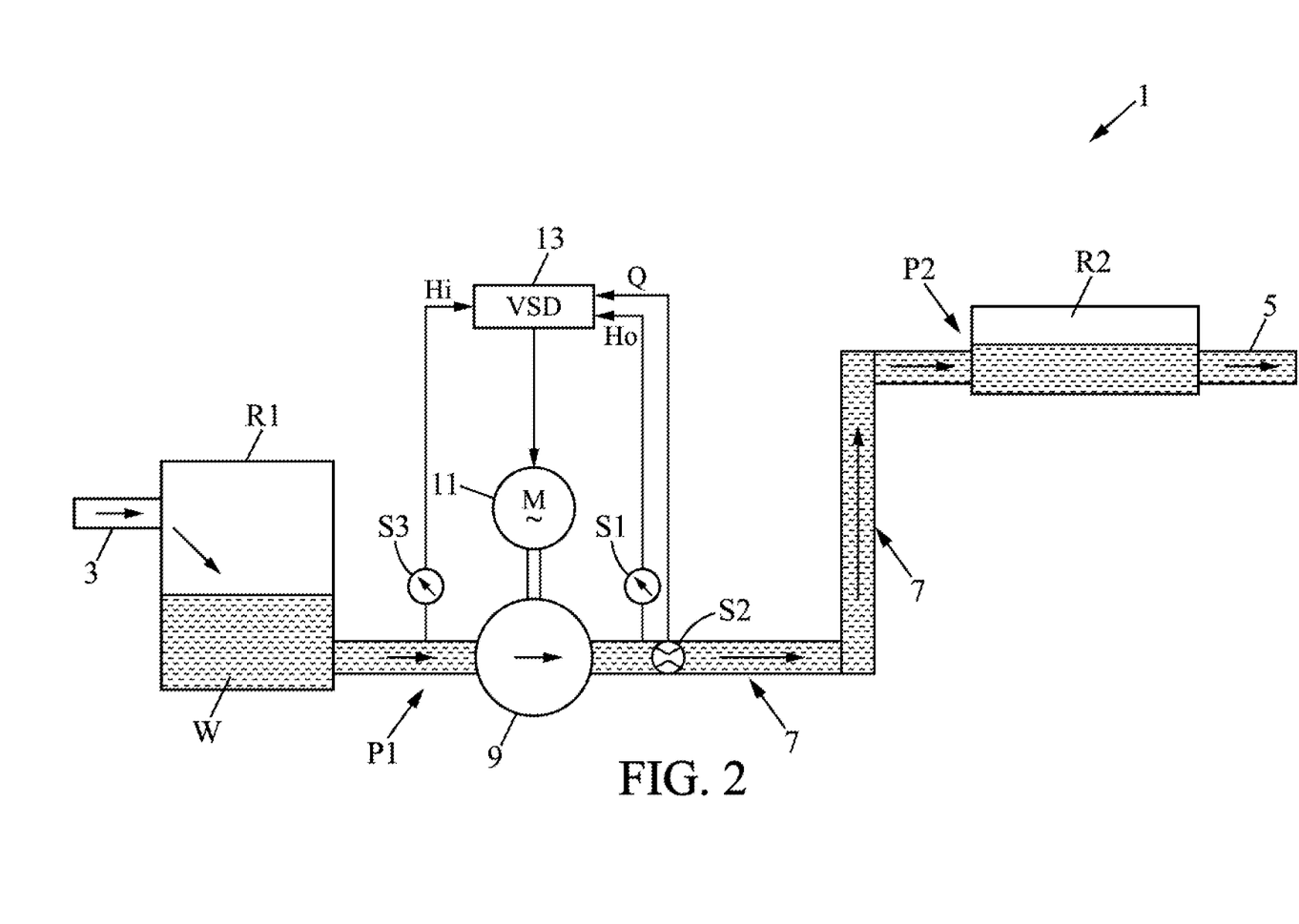
FIG. 2 is a second embodiment of a fluidic system of the present disclosure.

FIG. 2 shows a second embodiment of the present disclosure, which is different from the first embodiment shown in FIG. 1 in that the whole control of the hydraulic system 1 is implemented exclusively in the variable speed drive 13.

In other words, the variable speed drive 13 does not only control the rotational speed of the electric motor 11, but also controls the operation of the whole hydraulic system 1. In this second embodiment, it is the variable speed drive 13 that receives the measurements from the pressure sensors S1, S3 and the flow rate sensor S2. Also, the VSD 13 configures itself by carrying out the above-described automatic routine.

While the present disclosure has been described in the context of a hydraulic system including a centrifugal pump, its principles can be equally applied to any fluidic system having a VSD controlling the electric motor of a turbomachine transporting fluid through the system. For example, the fluidic system could be a heating, ventilation and air-conditioning or HVAC system, which has a compressor or a fan as the turbomachine. If the turbomachine is a compressor or a fan, the transported fluid may be a gas, such as air. Furthermore, the transported fluid may act as a working fluid.

The method and the variable speed drive of the present disclosure have in particular the following advantages:
- It becomes possible to identify the number of pole pairs of an arbitrary electric motor in complex mechanical configurations where decoupling the motor to test its characteristics is not an option;
- Since the identification of the number of pole pairs of the motor is simple and automated, it can be seamlessly integrated into the fluidic system control. Notably, after configuration, the electric motor can directly switch to normal operating mode without interruption;
- The determination of the number of pole pairs of the motor is very robust. Indeed, potential inaccuracies in the estimation of the motor's current rotational speed N can be smoothed out by rounding to the nearest integer.

The invention claimed is:

1. A method of setting up an electrical motor speed control in a fluidic system, the fluidic system being characterised by a given system curve, the fluidic system comprising:
   a turbomachine configured to transport fluid through the fluidic system, the turbomachine being characterised by a given performance curve for a known nominal rotational speed of a rotor of the turbomachine;
   an electric motor configured to rotate the turbomachine's rotor, the electric motor having a number of pole pairs;
   a variable speed drive configured to control a speed of the electric motor;
   a sensor configured to measure a parameter of the turbomachine, characterised by the turbomachine's performance curve; and
   a system controller configured to receive measurements of the sensor and for controlling the control an operation of the fluidic system,
   wherein the method comprises:
   driving the electric motor at a predetermined and constant electrical frequency under a control of the variable speed drive, such that the turbomachine's rotor rotates with a controlled rotational speed;
   determining, by the system controller, a point of intersection of the system curve and the performance curve to obtain a nominal operating point of the turbomachine in the fluidic system at the known nominal rotational speed, and thus a nominal value of the turbomachine parameter;
   measuring, with the sensor, a current value of the turbomachine parameter;
   calculating, by the system controller, the controlled rotational speed based on Affinity Laws applicable to turbomachines in combination with the determined nominal value of the turbomachine parameter, the measured current value of the turbomachine parameter and the known nominal rotational speed of the turbomachine's rotor;
   determining, by the system controller, the number of pole pairs of the electric motor based on a ratio of the electrical frequency and the calculated controlled rotational speed; and
   adapting a setup of the variable speed drive to match the determined number of pole pairs.

2. A variable speed drive for a rotational speed control of an electric motor having a number of pole pairs and driving a turbomachine installed in a fluidic system, the variable speed drive being configured to:
   drive the electric motor at a predetermined and constant electrical frequency such that the turbomachine rotates with a controlled rotational speed;
   obtain a system curve of the fluidic system and a performance curve of the turbomachine for a known nominal rotational speed;
   determine a point of intersection of the obtained system curve and the obtained performance curve to obtain a nominal operating point of the turbomachine in the fluidic system at the known nominal rotational speed, and thus a nominal value of a parameter of the turbomachine characterising an operation of the turbomachine;
   obtain a current value of the turbomachine parameter while the turbomachine is rotating at the controlled rotational speed;
   calculate the controlled rotational speed based on Affinity Laws applicable to turbomachines in combination with the determined nominal value of the turbomachine parameter, the obtained current value of the turbomachine parameter and the known nominal rotational speed of the turbomachine;
   determine the number of pole pairs of the electric motor based on a ratio of the electrical frequency and the calculated controlled rotational speed; and
   adapt a setup of the variable speed drive to match the determined number of pole pairs.

3. The method of claim 1, wherein the turbomachine parameter comprises one of a volumetric fluid flow rate generated by the turbomachine, a total dynamic head across the turbomachine, or a mechanical power delivered by the turbomachine.

4. The method of claim 1, wherein the turbomachine comprises one of a pump, a compressor, or a fan.

5. The method of claim 1, wherein the fluidic system comprises an HVAC system.

6. The method of claim 1, wherein the electric motor comprises a permanent magnet synchronous motor.

7. The method of claim 1, wherein the sensor comprises one of a pressure sensor, a flow rate sensor, or a power sensor.

8. The variable speed drive of claim 2, wherein the turbomachine parameter comprises one of a volumetric fluid flow rate generated by the turbomachine, a total dynamic head across the turbomachine, or a mechanical power delivered by the turbomachine.

9. The variable speed drive of claim 2, wherein the turbomachine comprises one of a pump, a compressor, or a fan.

10. The variable speed drive of claim 2, wherein the fluidic system comprises an HVAC system.

11. The variable speed drive of claim 2, wherein the electric motor comprises a permanent magnet synchronous motor.

12. The variable speed drive of claim 2, further comprising a sensor to obtain the current value, the sensor comprising one of a pressure sensor, a flow rate sensor, or a power sensor.

13. The method of claim 4, wherein the pump comprises a centrifugal pump.

14. The variable speed drive of claim 9, wherein the pump comprises a centrifugal pump.

* * * * *